United States Patent
Tanaka et al.

(10) Patent No.: US 12,104,071 B2
(45) Date of Patent: Oct. 1, 2024

(54) MIXED COATING MATERIAL

(71) Applicant: Fuji Jukogyo Kabushiki Kaisha, Tokyo (JP)

(72) Inventors: Taro Tanaka, Tokyo (JP); Takeshi Yoshida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 182 days.

(21) Appl. No.: 14/662,120

(22) Filed: Mar. 18, 2015

(65) Prior Publication Data
US 2023/0357590 A1 Nov. 9, 2023

(30) Foreign Application Priority Data
Mar. 28, 2014 (JP) ................. 2014-068023

(51) Int. Cl.
*C09D 127/18* (2006.01)
*C09D 175/04* (2006.01)

(52) U.S. Cl.
CPC ......... *C09D 127/18* (2013.01); *C09D 175/04* (2013.01)

(58) Field of Classification Search
CPC ...... C09D 127/18; C09D 175/04; C09K 3/18; C08K 7/16; C08K 2201/002; C08L 75/04; C08L 27/18
See application file for complete search history.

(56) References Cited

U.S. PATENT DOCUMENTS 6,117,555 A * 9/2000 Fujimori ................. B63B 59/04
428/447

FOREIGN PATENT DOCUMENTS

| CN | 102031057 A | 4/2011 | |
|----|----|----|----|
| JP | H 02-135252 A | 5/1990 | |
| JP | 6-67859 B2 | 8/1994 | |
| JP | H 08-003477 A | 1/1996 | |
| JP | H 08-003479 A | 1/1996 | |
| JP | H 08-239625 A | 9/1996 | |
| JP | 2000-297249 A | 10/2000 | |
| JP | 2002-053848 A | 2/2002 | |
| JP | WO2003093388 A1 * | 9/2005 | ............... C09K 3/18 |
| JP | 3848334 B2 | 11/2006 | |
| JP | 4175323 B2 | 11/2008 | |
| JP | 2013-136736 A | 7/2013 | |
| WO | WO 01/19932 A2 | 3/2001 | |
| WO | WO 03/093388 A1 | 11/2003 | |

OTHER PUBLICATIONS

Machine translation JP WO2003093388 A1 to Chong et al., published Sep. 8, 2005 (Year: 2005).*
Chinese Office Action dated Jun. 13, 2016.
JPO Decision to Grant a Patent dated Oct. 20, 2015.
JPO Notification of Refusal dated Jul. 21, 2015.

* cited by examiner

*Primary Examiner* — Jane L Stanley
(74) *Attorney, Agent, or Firm* — MCGINN I.P. LAW GROUP, PLLC

(57) ABSTRACT

A mixed coating material is obtained by mixing a cold curing resin that undergoes reaction curing at normal room temperature, and a fluororesin. The constituent ratio of the fluororesin in a coating film ranges from 43 wt % to 68 wt %.

4 Claims, 4 Drawing Sheets

MIXED COATING MATERIAL

CROSS-REFERENCE TO RELATED APPLICATIONS

The present application claims priority from Japanese Patent Application No. 2014-068023 filed on Mar. 28, 2014, the entire contents of which are hereby incorporated by reference.

BACKGROUND

1. Technical Field

The present invention relates to a mixed coating material that allows forming a highly water-repellent coating film.

2. Related Art

Anti-icing equipment is conventionally provided in aircraft for the purpose of preventing icing or the progress of icing in airframes. Examples of such anti-icing equipment include, for instance, thermal anti-icing equipment relying on engine bleed air or electricity, pneumatic deicing equipment relying on deicing boots, and chemical deicing equipment using alcohol. The role of anti-icing equipment in aircraft is to prevent icing or the progress of icing in the airframe, to avert thereby wasteful consumption of airframe fuel during flight, on account of hampering of smooth flow of air around the airframe, and increased air resistance derived from a reduction in wing lift, caused by icing.

Even in aircraft provided with anti-icing equipment, however, there are portions where icing cannot be completely controlled in practice by the anti-icing equipment, i.e. some icing occurs at portions beyond the anti-icing equipment capabilities. This inability of combating formation and growth of ice at portions, in the airframe, beyond the anti-icing equipment capabilities exerts a significant negative impact in terms of wasteful consumption of aviation fuel, due to the increased resistance during flight at those portions that lie outside the reach of the anti-icing equipment capabilities.

In order to solve this problem, it would be conceivable to increase the scale of the anti-icing equipment, or to run the anti-icing equipment more intensively, also for portions in the airframe that lie outside the reach of the anti-icing equipment capabilities, such as antennas, flap hinges, control horns and the like. However, this approach of extending the anti-icing effect elicited by the anti-icing equipment to portions beyond the anti-icing equipment capabilities has been thus far difficult to realize, on account of the increased airframe weight that results from increasing the scale of the anti-icing equipment, and the consumption of airframe fuel incurred in running the anti-icing equipment more intensively, all of which translates, contrarily, into yet greater consumption of the limited airframe fuel.

Research is accordingly being conducted to meet the desire of the industry for a coating material that elicits a high anti-icing effect and that enables easy application of the anti-icing effect also to portions in the airframe that lie outside the reach of the anti-icing equipment capabilities, i.e. an anti-icing effect that applies to all airframe surfaces, and such that, when used, the coating material adds little to the weight of the airframe, and does not incur thus wasteful consumption of fuel during flight.

Coating materials having a high anti-icing effect proposed thus far include mixed coating materials that allow forming highly water-repellent coating films, specifically, for instance, a mixed coating material (hereafter referred to as "AIS") that is obtained by mixing a mixed resin of an ultraviolet curable resin and a tetrafluoroethylene resin, with an organic solvent including a hydrofluorocarbon, in which the hardness of the coating film is 1H or higher (see Japanese Patent No. 3848334).

However, AIS is a coating material of ultraviolet curable type, and hence has the drawback of being difficult to use as a coating material for large structures, such as aircraft. Further problems of coating films that are formed using AIS include low durability, specifically a tendency to suffer from impaired water repellency performance due to erosion.

SUMMARY OF THE INVENTION

The present invention has been designed in consideration of the circumstances described above, and an object thereof is to provide a mixed coating material that allows forming a water-repellent coating film of high durability and that is cured at normal room temperature.

A first aspect of the invention provides a mixed coating material including: a cold curing resin that undergoes reaction curing at normal room temperature, and a fluororesin. A constituent ratio of the fluororesin in a coating film ranges from 43 wt % to 68 wt %.

The fluororesin may be a tetrafluoroethylene resin.

DETAILED DESCRIPTION

Figure 1A:
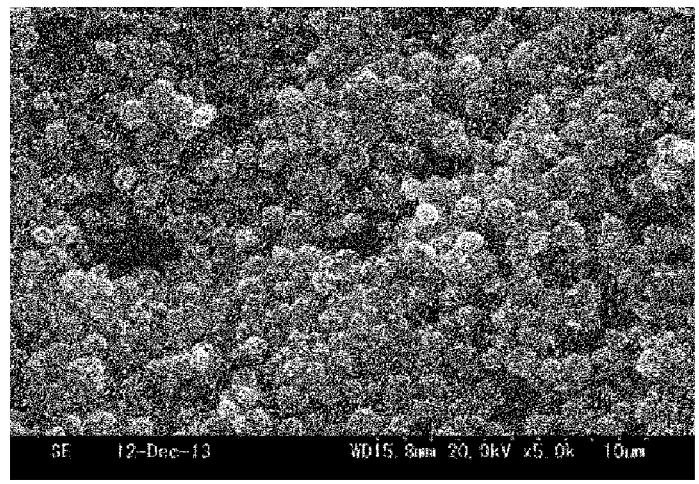
FIG. 1A is a SEM micrograph of the surface of a coating film formed through application of a coating material of Working example 2.

Working examples of the mixed coating material according to the present invention will be described.

The mixed coating material of the working examples is a cold curing coating material. Specifically, the mixed coating material of the present working examples is a coating material which is obtained by mixing a cold curing resin and a fluororesin, and which undergoes reaction curing at normal room temperature. A coating film is made up of the cold curing resin and the fluororesin. Herein, the term "coating film" denotes a coating film in a cured state.

Examples of cold curing resin include, for instance, polyurethane resins, fluororesins, acrylic urethane resins, acrylic resins, epoxy resins and the like. By using one type or a mixture of a plurality of types of these resins, it becomes possible to increase the strength of the coating film of the mixed coating material, without peeling of the coating film from the surface of the body to be coated, even under the action of erosion.

For instance, a tetrafluoroethylene resin (hereafter referred to as "PTFE") can be preferably used as the fluororesin.

Such PTFE is prepared for instance in accordance with the production method of Japanese Patent No. 1937532. The PTFE is not limited to being prepared in accordance with the above production method, and it suffices that the PTFE can be appropriately mixed with the cold curing resin. In particular, PTFE boasts a high water-repellent effect and can be suitably mixed with a cold curing resin. Accordingly, there is preferably used PTFE of low molecular weight, specifically PTFE having an average molecular weight ranging from 500 to 5,000.

The fluororesin is not limited to PTFE, and can be modified in any way, as appropriate. Preferably, however, the fluororesin has high water-repellent effect, similar or superior to that of PTFE, and can be mixed suitably with a cold curing resin.

In terms of being a highly water-repellent coating film, the water contact angle of the coating film is preferably 100° or larger, more preferably 120° or larger. Further, the coating film can be expected to afford a higher anti-icing effect by virtue of having high water slippage (i.e. the property whereby water slips readily over the coating film). In terms of being a coating film of high water slippage, the water sliding angle of the coating film is preferably 10° or smaller. However, a coating film that is highly water repellent and a coating film that boasts high water slippage cannot be obtained when the mixing ratio of fluororesin with respect to the total resin components (cold curing resin+fluororesin) included in the coating material is small. When the mixing ratio of the fluororesin is large, by contrast, there decreases the mixing ratio of the cold curing resin with respect to the total resin components included in the coating material; as a result, the durability of the coating film decreases, and the required durability may fail to be achieved.

Accordingly, a preferred range of the mixing ratio of the fluororesin with respect to the total resin components included in the coating material is such a range as allows obtaining a coating film having a water contact angle of 100° or larger, and obtaining a coating film of required durability and that affords a smooth coating operation; a more preferred range is such a range as allows obtaining a coating film having a water contact angle of 120° or larger, and obtaining a coating film of required durability and that affords a smooth coating operation; and a yet more preferred range is such a range as allows obtaining a coating film having a water contact angle of 120° or larger and a water sliding angle of 10° or smaller, and obtaining a coating film of required durability and that affords a smooth coating operation.

Similarly, a preferred range of the constituent ratio of the fluororesin in the coating film is such a range as allows the coating film to exhibit a water contact angle of 100° or larger, and to have the required durability. A more preferred range is such a range as allows the coating film to exhibit a water contact angle of 120° or larger, and to have the required durability. A yet more preferred range is such a range as allows the coating film to exhibit a water contact angle of 120° or larger and a water sliding angle of 10° or smaller, and to have the required durability.

A method for producing the mixed coating material of the working examples will be described. Note that the invention is not limited to the method described below.

The cold curing resin and the fluororesin are mixed by resorting to an ordinary mixing method. A liquid mixed coating material can be obtained as a result.

The obtained mixed coating material can be applied onto a simple metal such as aluminum iron, copper or the like, or an alloy thereof, or on pottery items such as tiles, plastics such as PET, and also on paper, cloth, nonwoven fabrics, coating film surfaces and the like. Specifically, the mixed coating material is effective when coated onto structures that require water-proofing and anti-icing, for instance transport equipment such as aircraft, wind turbine blades, antennas, buildings and the like.

The mixed coating material of the working examples cures at normal room temperature, i.e. just by being left to stand after application. Accordingly, the mixed coating material can be used appropriately as a coating material for large structures such as aircraft. Conventionally, coating films formed by a cold curing coating material are known to exhibit excellent durability by virtue of including a cold curing resin. A coating film formed by the mixed coating material of the working examples as well includes a cold curing resin, and accordingly, a water-repellent coating film can be obtained that has higher durability than a conventional coating material (AIS) that is a mixture of an ultraviolet curable resin and PTFE.

Working Example 1

Working examples of the present invention are described. Note that the present invention is not limited to these working examples.

Working Example 1

A coating material of Working example 1 was obtained by mixing a polyurethane resin, being a cold curing resin, and PTFE (low molecular weight PTFE), being a fluororesin, in such a manner that the constituent ratio of the cold curing resin in the coating film was 56.4 wt %, and the constituent ratio of the fluororesin was 43.6 wt %.

Working Example 2

A coating material of Working example 2 was obtained in accordance with the same technique as that of the coating material of Working example 1, in such a manner that the constituent ratio of the polyurethane resin in the coating film was 32.7 wt % and the constituent ratio of the fluororesin was 67.3 wt %.

Comparative Example 1

A commercially available polyurethane coating material was prepared as the coating material of Comparative example 1.

Comparative Example 2

A coating material of Comparative example 2 was obtained in accordance with the same technique as that of the coating material of Working example 1, in such a manner that the constituent ratio of the polyurethane resin in the coating film was 74.4 wt %, and the constituent ratio of the fluororesin was 25.6 wt %.

Comparative Example 3

Herein, 10 g of acrylic resin (UV-75, by Origin Electric Co., Ltd.), having a coating film hardness of 5H, and 11 g of dry PTFE were mixed. An organic solvent, resulting from mixing 24 g of a hydrofluorocarbon (Du Pont-Mitsui Fluorochemicals Company, Ltd.) and 55 g isopropyl alcohol, was added to the mixture of the two resins. After addition, the mixtures were stirred for 5 minutes in a disperser. This was followed by stirring for 15 minutes using a Motor Mill (by Eiger Japan Corporation), to yield AIS as the coating material in Comparative example 3.

Evaluation of water repellency and water slippage

The coating material of Working example 1 was diluted, as needed, using a solvent such as a thinner, was applied on an aluminum alloy surface using an air spray gun (by ANEST IWATA Corporation), and was cured at normal room temperature, to yield a sample produced through application of the coating material of Working example 1. The coating conditions by air spray gun were set to overspraying thrice (film thickness: 30 μm to 50 μm).

There were obtained a sample produced through application of the coating material of Working example 2, in accordance with the same technique as that of the sample produced through application of the coating material of Working example 1, and also a sample produced through application of the coating material (polyurethane coating material) of Comparative example 1 and a sample produced through application of the coating material of Comparative example 2.

The coating material (AIS) of Comparative example 3 was cured through irradiation of ultraviolet rays. Except for this feature, there was obtained a sample produced through application of the coating material (AIS) of Comparative example 3 in accordance with the same technique as that of the sample produced through application of the coating material of Working example 1.

To evaluate water repellency and water slippage, the water contact angle and the water sliding angle of each sample were measured at room temperature using a contact angle meter (Kyowa Interface Science Co., Ltd.).

The results are given in Table 1 and Table 2. The water sliding angle was not measured in the sample produced through application of the coating material (polyurethane coating material) of Comparative example 1.

TABLE 1

| Coating material | | Fluororesin content | Water contact angle | Water sliding angle |
| --- | --- | --- | --- | --- |
| Comparative example 1 | Polyurethane resin | 0 wt % | About 80° | — |
| Comparative example 2 | Fluoro- & polyurethane resin | 25.6 wt % | 82° | 12° |
| Working example 1 | Fluoro- & polyurethane resin | 43.6 wt % | 100° | 18° |
| Working example 2 | Fluoro- & polyurethane resin | 67.3 wt % | 149° | 5° |

The results in Table 1 revealed that the greater the fluororesin content (constituent ratio of the fluororesin in the coating film), the larger the water contact angle is, and that the water contact angle is 100° or larger if the content of fluororesin is 43.6 wt % or greater.

More preferably, the water contact angle is 120° or larger. In the light of results of Table 1, it is estimated that the water contact angle is 120° or larger if the fluororesin content is about 50 wt % or greater.

Yet more preferably, the water contact angle is 120° or larger and the water sliding angle is 10° or smaller. In the light of results of Table 1, it is estimated that the water contact angle is 120° or larger and the water sliding angle is 10° or smaller, if the content and fluororesin is about 55 wt % or greater.

A coating material was produced in which the content of the fluororesin exceeded 67.3 wt %, but binding forces inside the coating film from this coating material were low, and it was not possible to produce a sample having the required durability.

In the case of the present working example, therefore, a preferred ratio of the constituent ratio of the fluororesin in the coating film is 43.6 wt % to 67.3 wt %, a more preferred range is 50 wt % to 67.3 wt %, and a yet more preferred range is 55 wt % to 67.3 wt %.

TABLE 2

| Coating material | | Water contact angle | Water sliding angle |
| --- | --- | --- | --- |
| Comparative example 3 | AIS (UV-curable water repellent coating material) | 130° to 160° | 1° to 7° |
| Working example 2 | Fluoro- & polyurethane resin | 140° to 160° | 12° to 7° |

Table 2 illustrates results of measurements on water contact angle and water sliding angle of a plurality of samples that included a sample produced through application of the coating material of Working example 2, and a sample produced through application of the coating material (AIS) of Comparative example 3.

The results of Table 2 revealed that the coating material of Working example 2 delivers a performance similar to that of the coating material of Comparative example 3, that is, similar to that of AIS, which is a coating material of high anti-icing effect.

The sample produced through application of the coating material of Working example 2 exhibited smaller variability in water contact angle and smaller variability in water sliding angle than the sample produced through application of the coating material (AIS) of Comparative example 3. This is deemed to arise from the fact that the coating film formed through application of the coating material of Working example 2 exhibits a surface layer structure having a greater fractal character than that of the coating film formed by applying the coating material (AIS) of Comparative example 3.

Figure 1B:
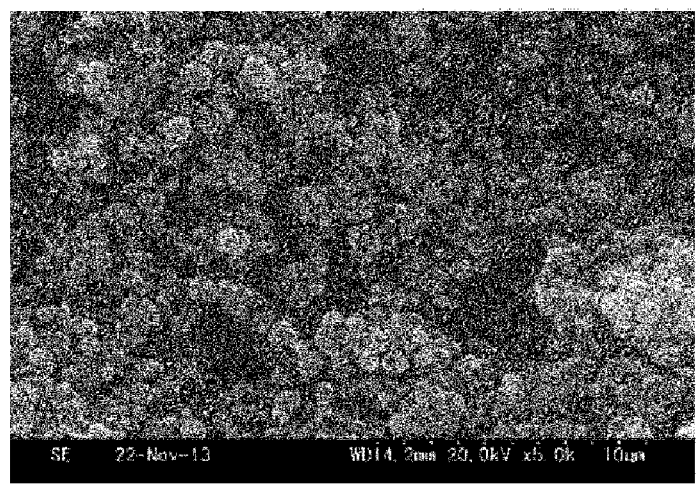
FIG. 1B illustrates a SEM micrograph of the surface of a coating film formed through application of a coating material (AIS) of Comparative example 3.

Herein, FIG. 1A illustrates a SEM micrograph of the surface of a coating film formed through application of the coating material of Working example 2, and FIG. 1B illustrates a SEM micrograph of the surface of a coating film formed through application of the coating material (AIS) of Comparative example 3.

These SEM micrographs reveal that the coating film (FIG. 1A) formed through application of the coating material of Working example 2 exhibits a surface layer structure having a greater fractal character than that of the coating film (FIG. 1B) formed through application of the coating material (AIS) of Comparative example 3. The particulate bodies in the SEM micrograph are PTFE. Herein, the coating film formed through application of the coating material of Working example 2 (FIG. 1A) exhibits a more homogeneous surface distribution of PTFE than that of the coating film (FIG. 1B) formed through application of the coating material (AIS) of Comparative example 3.

Evaluation of Durability

Figure 2A:
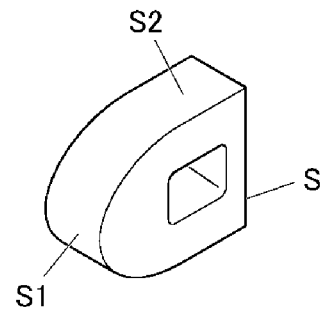
FIG. 2A is a schematic diagram of a specimen used in a rain erosion test.

A rain erosion test was performed in order to evaluate the durability of coating films. FIG. 2A illustrates a schematic diagram of a specimen S used in the rain erosion test, and FIG. 2B illustrates a schematic diagram of a rain erosion tester 10 used in the rain erosion test.

The specimen S has a D-shape, as illustrated in FIG. 2A. The portion of large curvature, within the curved surface that forms the D-shape will be referred to as portion S1, and one of the portions of small curvature will be referred to as portion S2.

Figure 2B:
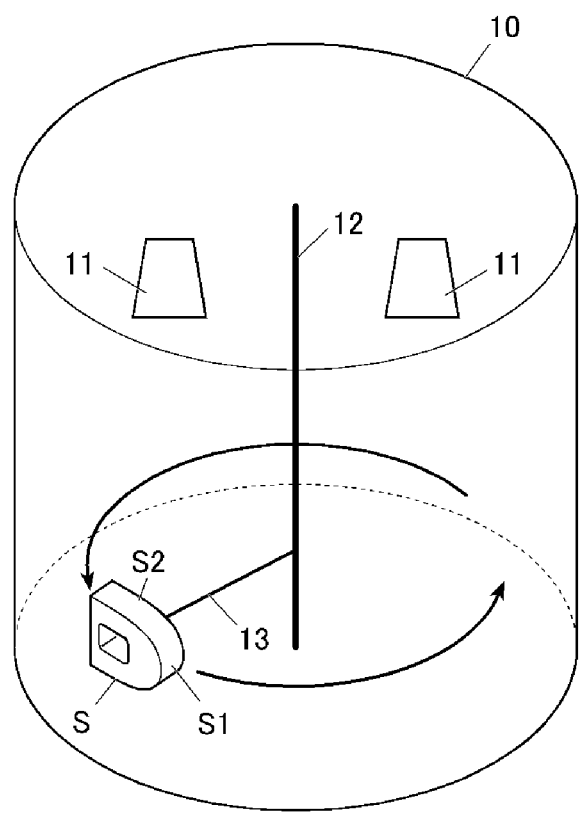
FIG. 2B is a schematic diagram of a rain erosion tester used in a rain erosion test.

As illustrated in FIG. 2B, the rain erosion tester 10 is configured by including spray nozzles 11, 11 for spraying a predetermined amount of water particles, and provided inside a cylindrical body, a rotating shaft 12 for rotating the specimen S, and a connection member 13 for connecting the rotating shaft 12 and the specimen S. A rain erosion test was performed by attaching a specimen S to the connection member 13 in such a manner that, during rotation, the portion S1 of the specimen S pointed in the rotation direction, and the portion S2 faced upward (towards the spray nozzles 11), causing the specimen S to rotate at the bottom of the interior of the rain erosion tester 10, and dropping water droplets from the spray nozzles 11, 11 that were provided at the top of the interior of the rain erosion tester 10, so that the water droplets struck the surface of the specimen S. The test conditions included a rainfall amount of 25 mm per hour, and a specimen speed of 120 mm per second.

The coating material of Working example 2 was applied, using an air spray gun (by ANEST IWATA Corporation), onto the surface of a specimen body made of aluminum having been degreased following a chemical conversion film process, and the coating material was cured at normal room temperature, to yield a specimen S produced through application of the coating material of Working example 2. The coating conditions by air spray gun were set to over-spraying thrice (film thickness: 30 μm to 50 μm).

There was obtained a specimen S produced through application of a coating material (polyurethane coating material) of Comparative example 1, according to the same technique as that of the specimen S produced through application of the coating material of Working example 2.

The coating material (AIS) of Comparative example 3 was cured through irradiation of ultraviolet rays. Except for this feature, there was obtained a specimen S produced through application of the coating material (AIS) of Comparative example 3, according to the same technique as that of the specimen S produced through application of the coating material of Working example 2.

Pictures of the specimens S were taken before and after the rain erosion test.

Figure 3:
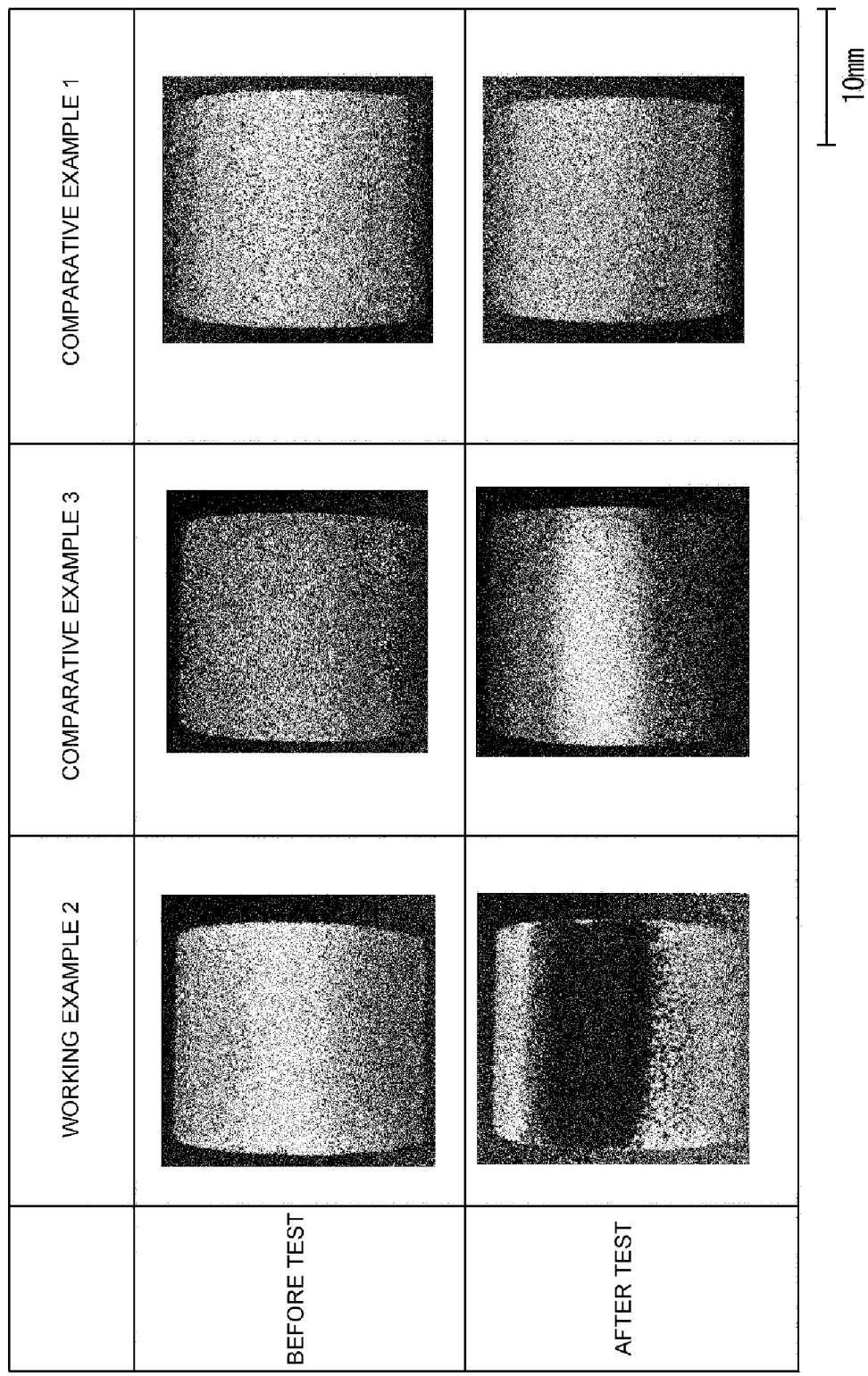
FIG. 3 is a set of photographs of specimens before and after a rain erosion test.
Figure 4:
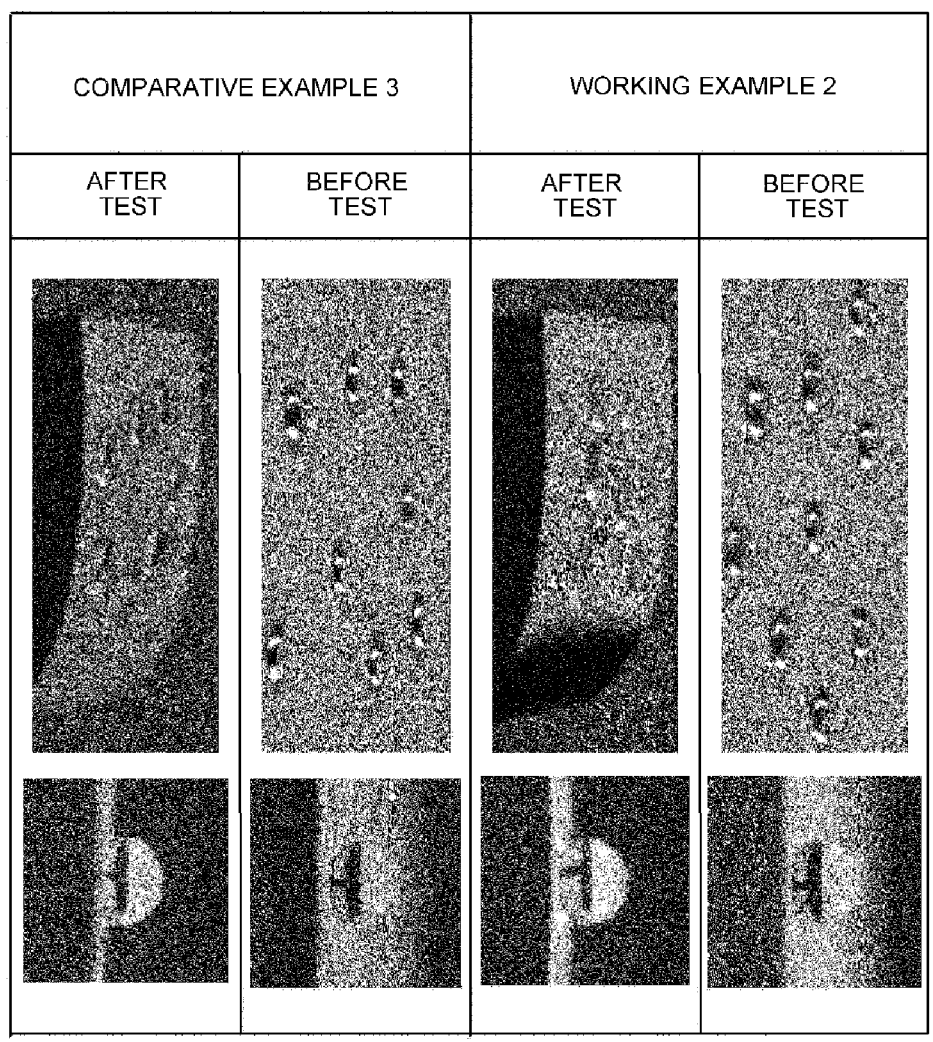
FIG. 4 is a set of photographs of specimens before and after a rain erosion test.

The results are depicted in FIG. 3 and FIG. 4.

As FIG. 3 reveals, it was found that the coating film peeled at a portion that eroded readily when the rain erosion test was performed, specifically, the portion S1, in the specimen S produced through application of the coating material of Working example 2 and the specimen S produced through application of the coating material (AIS) of Comparative example 3. By contrast, the specimen S produced through application of the coating material (polyurethane coating material) of Comparative example 1 exhibited no peeling of the coating film, even when having undergone the rain erosion test.

As FIG. 4 reveals, however, water repellency did not virtually drop at a portion that was not eroded readily, specifically, the portion S2, in the specimen S produced through application of the coating material of Working example 2, whereas water repellency dropped at a portion that was not readily eroded, specifically the portion S2, when the rain erosion test was performed, in the specimen S produced through application of the coating material (AIS) of Comparative example 3. That is, the water repellency performance in the coating film formed through application of the coating material (AIS) of Comparative example 3 exhibited an ongoing drop in water repellency performance accompanying thinning of the film as erosion proceeded, whereas the coating film formed through application of the coating material of Working example 2 exhibited high durability, in that the water repellency performance did not virtually drop even upon thinning of the coating film as erosion progressed. This is deemed to arise from the enhanced durability of the coating film brought about by using a polyurethane resin as the cold curing resin, having durability, in the coating material of Working example 2.

The invention claimed is:

1. A mixed coating material, consisting of:
a cold curing resin that undergoes reaction curing at normal room temperature; and
a tetrafluoroethylene resin including particulate bodies and having an average molecular weight ranging from 500 to 5000,
wherein a constituent ratio of the tetrafluoroethylene resin in a coating film that is a cured state of the mixed coating material ranges from 55 wt % to 67.3 wt %, and
wherein the cold curing resin is a polyurethane resin.

2. The mixed coating material according to claim 1, wherein the water contact angle is from 140° or larger to 160° or smaller and the water sliding angle is from 2° or larger to 7° or smaller.

3. A mixed coating material, comprising:
a cold curing resin that undergoes reaction curing at normal room temperature; and
a tetrafluoroethylene resin having particulate bodies and having an average molecular weight ranging from 500 to 5000, wherein
a constituent ratio of the tetrafluoroethylene resin in a coating film that is a cured state of the mixed coating material ranges from 55 wt % to 67.3 wt %,
the cold curing resin is a polyurethane resin, and
a water contact angle in the cured state of the mixed coating material is 120° or larger and a water sliding angle is 10° or smaller, the water contact angle and the water sliding angle being measured at room temperature using a contact angle meter.

4. The mixed coating material according to claim 3, wherein the water contact angle is from 140° or larger to 160° or smaller and the water sliding angle is from 2° or larger to 7° or smaller.

* * * * *